United States Patent [19]

Crankshaw

[11] Patent Number: 5,050,720
[45] Date of Patent: Sep. 24, 1991

[54] INTERCHANGEABLE FEEDSCREW SYSTEM

[75] Inventor: Michael Crankshaw, Santa Fe Springs, Calif.

[73] Assignee: Label-Aire Inc., Fullerton, Calif.

[21] Appl. No.: 428,123

[22] Filed: Oct. 27, 1989

[51] Int. Cl.$^5$ .................................................. B65G 33/02
[52] U.S. Cl. ................................ 198/467.1; 198/625; 198/675
[58] Field of Search ..................... 198/467.1, 625, 674, 198/675

[56] References Cited

U.S. PATENT DOCUMENTS

| | | | |
|---|---|---|---|
| 720,249 | 2/1903 | Harrison | 198/675 |
| 819,279 | 5/1906 | Huffman | 198/675 X |
| 2,630,904 | 3/1953 | Bozek | 198/467.1 X |
| 2,645,399 | 7/1953 | Bozek et al. | 198/467.1 X |
| 2,890,787 | 6/1959 | Carter | 198/411 |
| 3,012,650 | 12/1961 | Carter | 198/625 X |
| 3,054,496 | 9/1962 | Carter | 198/625 X |
| 3,841,946 | 10/1974 | Carter | 198/625 X |
| 4,561,534 | 12/1985 | Nalbach | 198/411 X |

FOREIGN PATENT DOCUMENTS 122582 9/1979 Japan ................................ 198/675

Primary Examiner—Robert P. Olszewski
Assistant Examiner—Cheryl L. Gastineau
Attorney, Agent, or Firm—Gordon L. Peterson; Loyal M. Hanson

[57] ABSTRACT

A feedscrew system includes a support structure for rotatably supporting a selected feedscrew assembly adjacent a conveyor in order to control articles moving on the conveyor toward a processing station, mounting components for mounting the selected feedscrew assembly on the support structure, and drive components for driving the selected feedscrew assembly at a desired rotational speed. A plurality of interchangeable feedscrew assemblies is included, including at least a first feedscrew assembly configured to be driven at a first rotational speed and a second feedscrew assembly configured to be driven at a second rotational speed that is different from the first rotational speed. The first feedscrew assembly includes a first feedscrew and a first coupling component connected to the first feedscrew for coupling the first feedscrew assembly to the drive components so that the first feedscrew assembly rotates at the first rotational speed. The second feedscrew assembly includes a second feedscrew and a second coupling component connected to the second feedscrew for coupling the second feedscrew assembly to the drive components so that the second feedscrew assembly rotates at the second rotational speed.

12 Claims, 2 Drawing Sheets

INTERCHANGEABLE FEEDSCREW SYSTEM

BACKGROUND OF THE INVENTION

1. Technical Field

This invention relates generally to feedscrew systems, such as those used to separate and orient bottles or other articles in preparation for labelling, and it relates more particularly to a new and improved feedscrew system featuring interchangeable feedscrew assemblies.

2. Background Information

Some feedscrew systems control the movement of articles along a conveyor in order to maintain the spacing desired for subsequent processing. In the case of label application, for example, the articles move along the conveyor into the entrance end of a pair of parallel feedscrews that are located above the conveyor in a position ahead of a label applicator. The feedscrews may be about eighteen to forty-eight inches long and four inches in diameter, and as they rotate they capture the articles in the valleys of the feedscrew threads so that the articles leave the exit end of the feedscrews with spacing that conforms to the threads, just right for the label applicator.

However, there are certain problems with existing feedscrew systems that need to be overcome, such as the common need to change feed characteristics several times daily according to the particular articles being labelled. A typical days production may, for example, include filling, capping, and labelling several different article sizes at different rates, such as 64-ounce liquid detergent bottles at a rate of 50 bottles/minute, 32-ounce bottles at 100/minute, and 16-ounce bottles at 200/minute. Each of those bottle sizes requires different feed characteristics (e.g., the article size the feedscrews accommodate as well as the resulting article spacing and speed) so that the feedscrews may have to be replaced frequently.

That task can be complicated by the need to change the feedscrew rotational speed according to the feedscrew pitch length (i.e., the distance an article travels in one revolution of the feedscrews). In other words, the speed at which the articles leave the exit end of the feedscrews should match the conveyor speed. As a result, it may become necessary in the case of a given conveyor speed to change feedscrew rotational speed—slower for a longer feedscrew pitch length and faster for a shorter pitch length.

But existing systems may employ a somewhat complicated feedscrew drive arrangement requiring that gears, sprockets, and/or belts be changed in order to change feedscrew rotational speed. As a result, the task of replacing feedscrews can be somewhat involved and time consuming and even require the services of a line mechanic rather than being something the system operator can do. Consequently, it is desirable to have some way to alleviate the foregoing concerns.

SUMMARY OF THE INVENTION

This invention solves the problems outlined above by providing a feedscrew system that includes a set of interchangeable feedscrew assemblies. Each includes a feedscrew and a gear or other speed-determining component attached to the feedscrew so that the feedscrew assembly includes its own speed-determining component. In addition, a feedscrew drive arrangement is provided that receives the feedscrew assembly to enable convenient replacement of the feedscrew assemblies without replacing drive components. Thus, the task of replacing feedscrews is sufficiently less complicated that it can be done conveniently by an operator without the services of a line mechanic.

Generally, a system constructed according to the invention includes a support structure for rotatably supporting a selected feedscrew assembly adjacent a conveyor in order to control articles moving on the conveyor toward a processing station, means for mounting the selected feedscrew assembly on the support structure, and means for driving the selected feedscrew assembly at a desired rotational speed. Those components are in some respects similar to existing systems and they may be configured as part of a label applicator system.

According to a major aspect of the invention, there is provided a plurality of interchangeable feedscrew assemblies, including at least a first feedscrew assembly configured to be driven at a first rotational speed and a second feedscrew assembly configured to be driven at a second rotational speed that is different from the first rotational speed. The first feedscrew assembly includes a first feedscrew and first coupling means connected to the first feedscrew for coupling the first feedscrew assembly to the drive means so that the first feedscrew assembly rotates at the first rotational speed, and the second feedscrew assembly includes a second feedscrew and second coupling means connected to the second feedscrew for coupling the second feedscrew assembly to the drive means so that the second feedscrew assembly rotates at the second rotational speed.

The first coupling means may include a first gear mounted on the first feedscrew and the second coupling means may include a second gear mounted on the second feedscrew that is different from the first gear. In addition, the drive means may include a drive gear for driving the first gear when the first feedscrew assembly is mounted on the support structure and the second gear when the second feedscrew assembly is mounted on the support structure. Furthermore, the first and second gears may have different diameters and the drive means may include means for accommodating the different diameters.

The foregoing and other objects and features of the invention and the manner of attaining them will become apparent and the invention itself will be best understood by reference to the following description taken in conjunction with the accompanying illustrative drawings.

DESCRIPTION OF THE PREFERRED EMBODIMENTS

Figure 1:
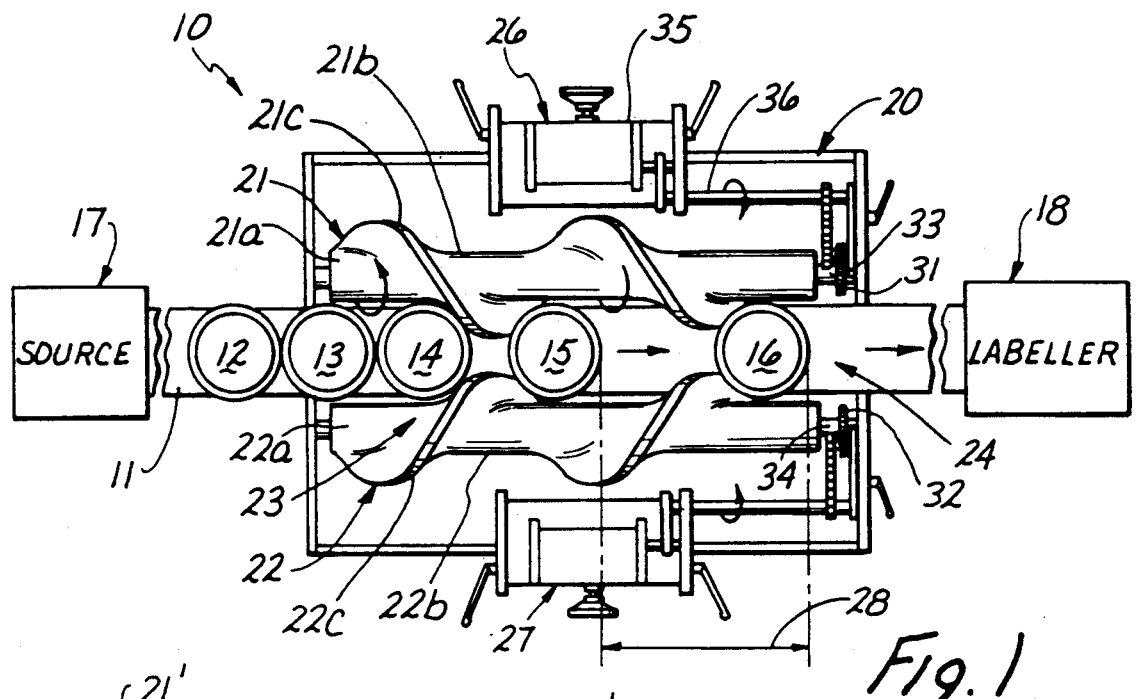
FIG. 1 of the drawings is an overhead diagrammatic representation of a feedscrew system constructed according to the invention.

Referring now to the drawings, there is shown a feedscrew system 10 constructed according to the invention. It is similar in many respects to the feedscrew system described in U.S. Pat. application Ser. No. 428,121 filed Oct. 27, 1989 (of Arthur Bruce Newell and Dwain M. Gipson entitled "Feedscrew System And Methodology" which was filed the same date as this application), and that application is incorporated by reference for the details provided.

The feedscrew system 10 is used in conjunction with a known type of conveyor 11 (FIG. 1) or other suitable means for moving articles 12-16 from a source of the articles (depicted in FIG. 1 by a source 17) toward a processing station (i.e., a location beyond the feedscrew system 10 where an operation is to be performed on the articles 12-16), such as that depicted in FIG. 1 by a label applicator or labeller 18. The feedscrew system 10 is mounted by suitable known means in a suitable known position adjacent the conveyor 11 where it is used to separate and orient the articles 12-16 in preparation for labelling, and it includes a suitable support structure 20 for rotatably supporting at least one and preferably a pair of feedscrew assemblies (so that the feedscrews can rotate), such as the feedscrew assemblies 21 and 22 in FIG. 1. In other words, the support structure 20 rotatably supports a selected feedscrew assembly adjacent the conveyor 11 in order to control the articles 12-16 as they move on the conveyor 11 toward the labeller 18.

The feedscrew assemblies 21 and 22 extend from a capture point or entrance 23 of the feedscrew assemblies 21 and 22 to a release point or exit 24. They serve as feedscrew means for spacing the articles 12-16 on the way to the labeller 18. In that regard, the feedscrew assembly 21 includes a feedscrew 21a having a feedscrew thread with a valley 21b between a crest 21c. Similarly, the feedscrew assembly 22 includes a feedscrew 22a having a feedscrew thread with a valley 22b between a crest 22c. The feedscrew assemblies 21 and 22 are supported by the support structure 20 proximate the conveyor 11 in order that the articles 12-16 can be captured in the valleys 21b and 22b of the feedscrew threads (FIG. 1), between the crests 21c and 22c as the feedscrew assemblies 21 and 22 are rotated by respective ones of first and second drive means 26 and 27, each serving as means for driving a selected feedscrew assembly at a desired rotational speed.

So captured, the articles 12-16 leave the exit 24 of the feedscrew assemblies 21 and 22 with spacing between adjacent ones of the articles 12-16 that conforms to the pitch or pitch length of the feedscrew assemblies 21 and 22 (depicted in FIG. 1 by the dimension designated with reference numeral 28), just right for the labeller 18 or other processing station. To accomplish that, the feedscrews 21 and 22 are dimensioned and arranged with an appropriate pitch length and they are rotated at an appropriate rotational speed. As a result, they exhibit the feed characteristics desired for a particular job.

However, when a job requires different feed characteristics than those exhibited by the feedscrews 21a and 22a, the feedscrew assemblies 21 and 22 must be replaced and the rotational speed changed accordingly. In order to facilitate doing so, the instant invention provides a plurality of interchangeable feedscrew assemblies that exhibit different feed characteristics, each feedscrew assembly including a speed-determining component that coacts with the drive means to result in a desired rotational speed. That results in the rotational speed be automatically changed to a desired speed when the feedscrew assembly is replaced without the operator having to replace drive components. In that regard, the feedscrew systems are interchangeable in the sense that one can be replaced with another without changing other drive components of the system 10.

Figure 2:
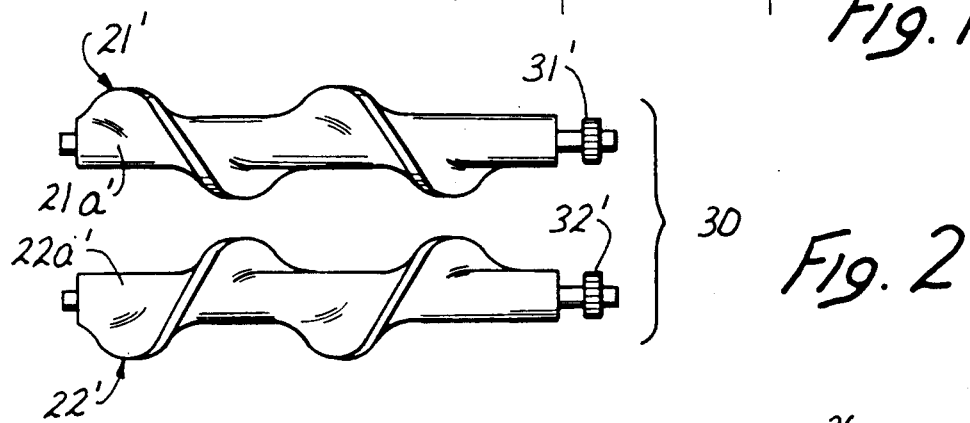
FIG. 2 is an enlarged elevation view of mounting and drive components.

Thus, for a system such as the system 10 that employs a pair of feedscrew assemblies, there is provided a plurality of interchangeable pairs of feedscrew assemblies, including at least the first pair of feedscrew assemblies 21 and 22 already discussed that is configured to be driven at a first rotational speed and a second pair 30 of feedscrew assemblies 21' and 22' (FIG. 2) that is configured to be driven at a second rotational speed different from the first rotational speed. The first and second pair of feedscrew assemblies are configured to be driven at first and second rotational speeds in the sense that the pitch lengths of the feedscrews are such that the first and second rotational speeds are rotational speeds that result in the articles 12-16 moving out of the exit 24 toward the labeller 18 at a speed substantially the same as that of the conveyor 11.

In order to produce the rotational speed desired, each of the feedscrew assemblies 21 and 22 includes a speed-determining component (such as a respective one of the gears 31 and 32 in FIG. 1) that cooperates with the drive means 26 and 27 to result in the first rotational speed. In other words, the speed-determining means is connected to each of the first pair of feedscrew assemblies for coupling the feedscrew assembly to the drive means so that the first feedscrew assembly rotates at the first rotational speed. Similarly, each of the feedscrew assemblies 21' and 22' includes another speed-determining component (such as a respective one of the gears 31' and 32' in FIG. 2) that cooperates with the drive means 26 and 27 to result in the second rotational speed.

In other words, the first pair of feedscrew assemblies 21 and 22 includes a first pair of feedscrews 21a and 22a and a pair of first coupling means in the form of gears 31 and 32 mounted on axles 33 and 34. Each of the pair of first coupling means (i.e., the gears 31 and 32) is connected to a respective one of the first pair of feedscrews 21a and 22a where it serves the function of coupling the respective one of the first pair of feedscrews 21a and 22a to the drive means 26 and 27 so that each of the first pair of feedscrew assemblies 21 and 22 rotates at the first rotational speed. Similarly, the second pair of feedscrew assemblies 21' and 22' includes a second pair of feedscrews 21a' and 22a' and a pair of second coupling means in the form of gears 31' and 32'. Each of the pair of second coupling means (i.e., the gears 31' and 32') is connected to a respective one of the second pair of feedscrews 21a' and 22a' where it serves the function of coupling the respective one of the second pair of feedscrews 21a' and 22a' to the drive means 26 and 27 so that each of the second pair of feedscrew assemblies 21' and 22' rotate at the second rotational speed.

The gears 31 and 32 are the same size and the gears 31' and 32' are the same size. But, the size of the gears 31 and 32 is different from the size of the gears 31' and 32'. That results in the first rotational speed being different from the second rotational speed. Otherwise, the feedscrew assemblies 21' and 22' are generally similar to the feedscrew assemblies 21 and 22 so that they are not described in further detail.

Of course, the inventive concepts disclosed apply equally well to a system that employs only one feedscrew assembly. Such a system can be envisioned by supposing that the feedscrew assembly 22 in FIG. 1 is replaced with a guide surface opposite the feedscrew assembly 21, the guide surface extending from the entrance 23 to the exit 24 in a position abutting the articles 12-16 so that the articles slide along the guide surface as they move within the valley 21b of the feedscrew 21a toward the labeller 18. In that case, the invention provides a plurality of at least first and second interchangeable feedscrew assemblies (such as the feedscrew assemblies 21 and 21') instead of first and second pairs of interchangeable feedscrew assemblies.

Figure 3:
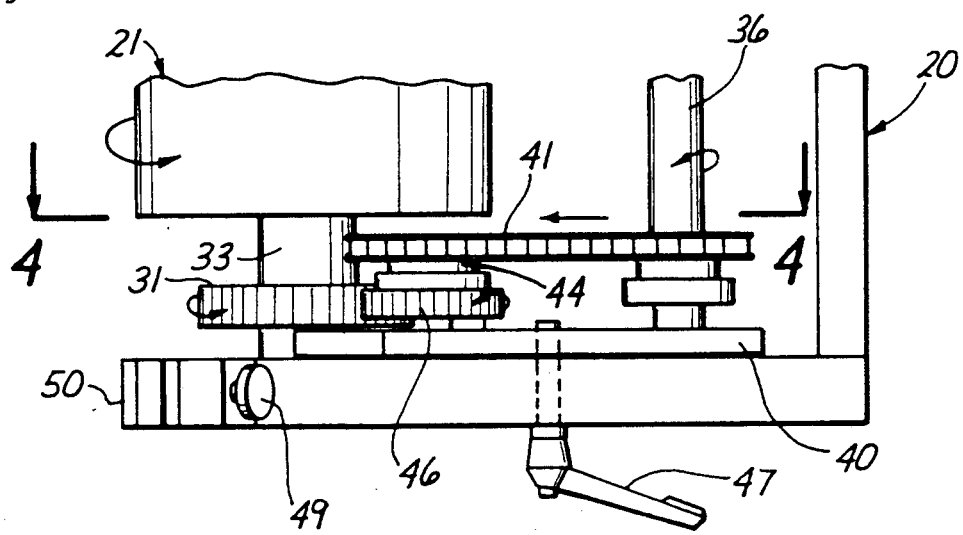
FIG. 3 is a detail view of drive components taken on line 3—3 of FIG. 2.
Figure 4:
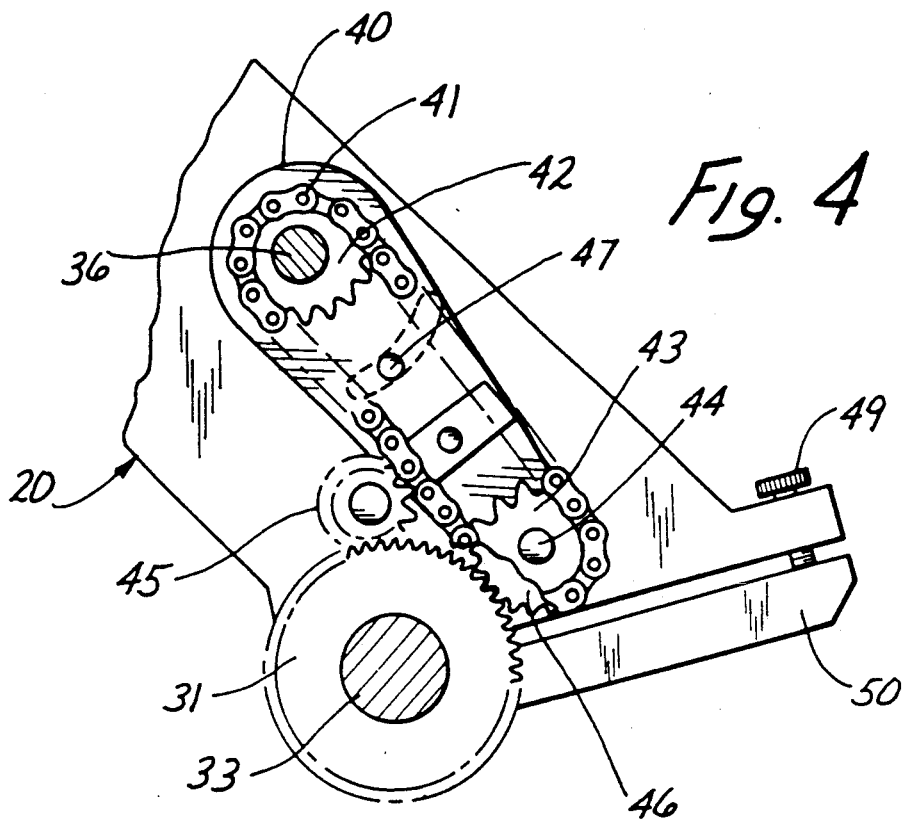
FIG. 4 is another view of the drive components showing the feedscrew mounted on the support structure.
Figure 5:
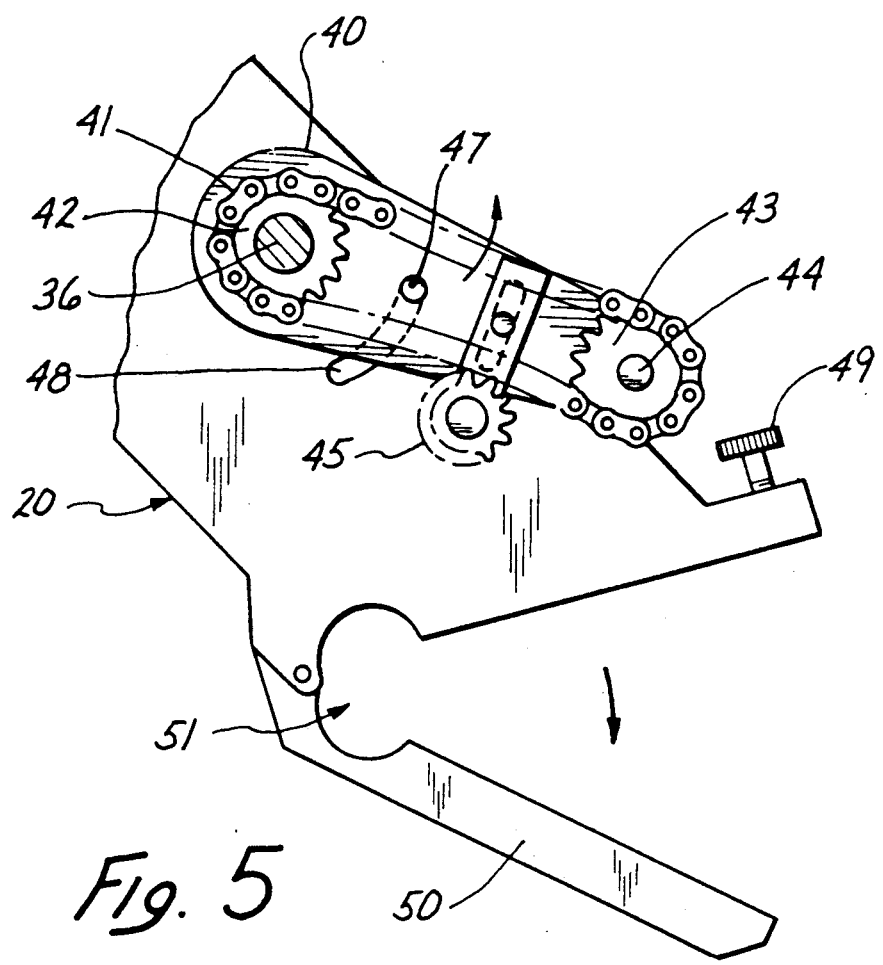
FIG. 5 is a view similar to FIG. 4 showing operation of the mounting components.

Further details of the drive components are shown in FIGS. 3–5, and because the drive means 27 is generally similar to the drive means 26, only the drive means 26 is described in further detail. Generally, the drive means 26 includes a gearbox 35 (FIG. 1) driven by a suitable source of power such as an electric motor (not shown). A shaft 36 couples the gearbox 35 to an adjustable coupling arrangement that couples the shaft 36 to the gear 31 on the feedscrew assembly 21 (or the gear 31' on the feedscrew assembly 21' when the feedscrew assembly 21' is in use).

The adjustable coupling arrangement includes a pivotable plate 40 (FIGS. 3–5) which serves as means for movably supporting various coupling components subsequently described. For that purpose, the shaft 36 is suitably journalled in the support structure 20 to enable the shaft 36 to rotate and the plate 40 is suitably mounted to pivot (preferably about the shaft 36). A known type of drive chain 41 couples a sprocket 42 (FIGS. 4 and 5) on the shaft 36 with a sprocket 43 on a shaft 44 that is also journalled in the plate 40, while an idler gear 45 that is mounted on the plate 40 by suitable known means maintains drive chain tension in a known manner.

A drive gear 46 is also mounted on the shaft 44 and it engages the gear 31 on the feedscrew assembly 21 when the plate 40 is pivoted to an appropriate position. That couples the drive means 26 to the feedscrew assembly 21. A known type of locking handle 47 connected in a known manner through a slot 48 to the plate 40 rides within the slot 48 as the operator pivots the plate 40 to the appropriate position (FIGS. 4 and 5), and then the operator locks the handle 47 (such as by rotating it) to secure the plate 40 in position.

In order to replace the feedscrew assembly 21 with another feedscrew assembly, the operator disengages or unlocks the handle 47 and pivots the plate 40 so that the drive gear 46 moves away from the gear 31 on the feedscrew assembly 21. Next, the operator loosens a retaining screw 49 on the support structure 20 in order to pivot a mounting member 50 as shown in FIG. 5. That releases the axle 33 of the feedscrew assembly 21 from the opening 51, the mounting member 50 serving as mounting means for mounting a selected feedscrew assembly on the support structure 20. Of course, various other known types of mounting means may be used within the inventive concepts disclosed.

Then, the operator removes the feedscrew assembly 21 and replaces it with another feedscrew assembly having the desired feed characteristics (e.g., the feedscrew assembly 21'), reversing the foregoing steps to secure the replacement feedscrew assembly in place and couple the drive means 26 to it. As a result, the adjustable coupling components can accommodate different size gears on the feedscrew assemblies so that the gears on the feedscrew assemblies can be configured as required to produce the rotational speed desired (i.e., the gears may have different diameters).

Thus, this invention provides a feedscrew system that includes a set of interchangeable feedscrew assemblies and a feedscrew drive arrangement receives a selected feedscrew assembly to enable convenient replacement without replacing drive components. Thus, the task of replacing feedscrews is sufficiently less complicated that it can be done conveniently by an operator without the services of a line mechanic.

Although an exemplary embodiment of the invention has been shown and described, many changes, modifications, and substitutions may be made by one having ordinary skill in the art without necessarily departing from the spirit and scope of the invention.

What is claimed is:

1. A feedscrew system, comprising:
   means defining a support structure for rotatably supporting a selected feedscrew assembly adjacent a conveyor in order to control articles moving on the conveyor toward a processing station;
   mounting means for releasably and rotatably mounting the selected feedscrew assembly on the support structure so that the selected feedscrew assembly can be mounted on and removed from the support structure as a unit;
   drive means for driving the selected feedscrew assembly at a desired rotational speed;
   a plurality of interchangeable feedscrew assemblies, including at least a first feedscrew assembly and a second feedscrew assembly;
   the first feedscrew assembly including a first feedscrew and first coupling means mounted on the first feedscrew for coupling the first feedscrew assembly to the drive means so that the first feedscrew assembly rotates at a first rotational speed;
   the second feedscrew assembly including a second feedscrew and second coupling means mounted on the second feedscrew for coupling the second feedscrew assembly to the drive means so that the second feedscrew assembly rotates at a second rotational speed which is different from the first rotational speed; and
   said drive means being capable of accommodating and driving the coupling means of said first and second feedscrew assemblies.

2. A system as recited in claim 1, wherein the system includes a conveyor and a label applicator, and the means defining a support structure is configured to rotatably support the selected one of the first and second feedscrew assemblies adjacent the conveyor in order to control articles moving on the conveyor toward the label applicator.

3. A system as recited in claim 1, wherein the first coupling means includes a first gear mounted on the first feedscrew and the second coupling means includes a second gear mounted on the second feedscrew that is different from the first gear.

4. A system as recited in claim 3, wherein the drive means includes a drive gear for driving the first gear when the first feedscrew assembly is mounted on the support structure and the second gear when the second feedscrew assembly is mounted on the support structure.

5. A system as recited in claim 4, wherein the drive means includes means for holding gear in engagement with the first gear when the first feedscrew assembly is mounted on the support structure and in engagement with the second gear when the second feedscrew assembly is mounted on the support structure.

6. A system as recited in claim 3, wherein the first and second gears have different diameters and the drive means includes means for accommodating the different diameters.

7. A set of feedscrew assemblies for use with drive means for driving a selected feedscrew assembly at a desired rotational speed, the set of feedscrew assemblies comprising:
   a plurality of interchangeable feedscrew assemblies having different feed characteristics and including at least a feedscrew assembly and a second feedscrew assembly;
   the first feedscrew assembly including a first feedscrew and second coupling means mounted on the second feedscrew for coupling the second feedscrew assembly to the drive means so that the first feedscrew assembly rotates at a first rotational speed: and
   the second feedscrew assembly including a second feedscrew and second coupling means mounted on the second feedscrew for coupling the second feedscrew assembly to the drive means so that the second feedscrew assembly rotates at a second rotational speed which is different from the first rotational speed.

8. A set of feedscrew assemblies as recited in claim 7, wherein the first coupling means includes a first gear mounted on the first feedscrew and the second coupling means includes a second gear mounted on the second feedscrew that is different from the first gear.

9. A feedscrew system, comprising:
   means defining a support structure for rotatably supporting a selected pair of feedscrew assemblies adjacent a conveyor in order to control articles moving on the conveyor toward a processing station;
   mounting means for releasably and rotatably mounting the selected pair of feedscrew assemblies on the support structure, said mounting means allowing each of the selected feedscrew assemblies to be mounted on and removed rom the support structure as a unit;
   drive means for driving the selected pair of feedscrew assemblies at a desired rotational speed;
   a plurality of interchangeable pairs of feedscrew assemblies, including at least a first pair of feedscrew assemblies and a second pair of feedscrew assemblies;
   the first pair of feedscrew assemblies including a first pair of feedscrews and a pair of first coupling means, each of which pair of first coupling means is mounted on a respective one of the first pair of feedscrews for coupling the respective one of the first pair of feedscrews to the drive means so that the first pair of feedscrew assemblies rotates at a first rotational speed;
   a second pair of feedscrew assemblies including a second pair of feedscrews and a pair of second coupling means, each of which pair of second coupling means is mounted on a respective one of the second pair of feedscrews for coupling the respective one of the second pair of feedscrews to the drive means so that the second pair of feedscrew assemblies rotates at a second rotational speed which is different from the first rotational speed; and
   said drive means being capable of accommodating and driving the coupling means of said first and second pairs of feedscrews.

10. A system as recited in claim 9, wherein the system includes a conveyor and a label applicator, and the means defining a support structure is configured to rotatably support the selected one of the first and second pairs of feedscrew assemblies adjacent the conveyor in order to control articles moving on the conveyor toward the label applicator.

11. A system as recited in claim 9, wherein:
   each one of the pair of first coupling means includes one of a pair of first gears, each of which pair of first gears is mounted on a respective one of the first pair of feedscrews; and
   each one of the pair of second coupling means includes one of a pair of second gears different from the pair of first gears, each of which pair of second gears is mounted on a respective one of the second feedscrews.

12. A feedscrew system comprising:
   a support structure;
   a feedscrew assembly including a feedscrew and a gear mounted on the feedscrew;
   means for releasably and rotatably mounting the feedscrew assembly on the support structure;
   drive means on the supporting structure for co-acting with the gear to drive the feedscrew, said drive means including a movable element for engaging and driving said gear and means for adjusting the location of the movable element relative to the gear whereby the drive means can cooperate with another feedscrew having a different diameter gear mounted on such another feedscrew.

* * * * *

UNITED STATES PATENT AND TRADEMARK OFFICE
CERTIFICATE OF CORRECTION

PATENT NO. : 5,050,720

DATED : September 24, 1991

INVENTOR(S) : Michael Crankshaw

It is certified that error appears in the above-identified patent and that said Letters Patent is hereby corrected as shown below:

Column 6, line 62, before "gear" insert --the drive--.

Column 7, line 9 after "least a" insert -- first --.

Column 7, line 12 change "second" to -- first --.

Column 7, line 13 change both occurences of "second" to -- first --.

Column 7, line 16 before "and" change the colon to a semi-colon.

Column 7, line 39 change "rom" to -- from --.

Signed and Sealed this

Sixteenth Day of February, 1993

Attest:

STEPHEN G. KUNIN

Attesting Officer     Acting Commissioner of Patents and Trademarks